US008452873B2

(12) United States Patent
Chen et al.

(10) Patent No.: US 8,452,873 B2
(45) Date of Patent: May 28, 2013

(54) PROVISIONING OF RESOURCES IN A COMPUTER NETWORK

(75) Inventors: Paul Ming Chen, Markham (CA); Geyu Li, Scarborough (CA); Michael George Polan, Markham (CA)

(73) Assignee: International Business Machines Corporation, Armonk, NY (US)

( * ) Notice: Subject to any disclaimer, the term of this patent is extended or adjusted under 35 U.S.C. 154(b) by 1517 days.

(21) Appl. No.: 11/555,462

(22) Filed: Nov. 1, 2006

(65) Prior Publication Data
US 2008/0104244 A1    May 1, 2008

(51) Int. Cl.
*G06F 15/173*    (2006.01)
*G06F 17/00*    (2006.01)

(52) U.S. Cl.
USPC ........... 709/226; 709/207; 709/225; 709/204; 709/203; 709/211; 709/239; 709/201; 709/220; 455/517; 455/518; 455/519; 455/515; 455/458

(58) Field of Classification Search
USPC ................. 709/226, 207, 225, 204, 203, 211, 709/239, 220
See application file for complete search history.

(56) References Cited

U.S. PATENT DOCUMENTS

| 6,871,232 | B2 |  | 3/2005 | Curie et al. |  |
|---|---|---|---|---|---|
| 6,947,989 | B2 |  | 9/2005 | Gullotta et al. |  |
| 7,840,192 | B2 | * | 11/2010 | Rao et al. | 455/90.2 |
| 7,941,387 | B2 | * | 5/2011 | Amini et al. | 706/46 |
| 8,176,138 | B1 | * | 5/2012 | Abdelaziz | 709/207 |
| 2003/0217101 | A1 |  | 11/2003 | Sinn |  |
| 2004/0010591 | A1 |  | 1/2004 | Sinn et al. |  |
| 2004/0162906 | A1 | * | 8/2004 | Griffin et al. | 709/229 |
| 2004/0181476 | A1 | * | 9/2004 | Smith et al. | 705/35 |
| 2005/0108526 | A1 | * | 5/2005 | Robertson | 713/166 |
| 2005/0197146 | A1 | * | 9/2005 | Rao et al. | 455/519 |
| 2007/0089162 | A1 | * | 4/2007 | Park et al. | 726/1 |

OTHER PUBLICATIONS

Kern et al., "Rule Support for Role-Based Access Control", SACMAT'05, 2005, Stockholm Sweden, pp. 130-138.
Young, "Human Resources have a vital role to play within employee identity and access management", Access Management, Network Security, Nov. 2004, pp. 5-7.
Montanari et al., "Context-based Security Management for Multi-Agent Systems", 2nd Symposium on Multi-Agent Security and Survivability, 2005 IEEE, Aug. 30-31, 2005, pp. 75-84.
Ross, "Identity Architecture", 2003, Information Systems Audit and Control Association, InformationSystems Control Journal, vol. 4, 2003, pp. 1-2.

* cited by examiner

*Primary Examiner* — Jude Jean Gilles
(74) *Attorney, Agent, or Firm* — Yee & Associates, P.C.; Jeffrey S. LaBaw (57) ABSTRACT

A method, apparatus, and computer program product for selectively and programmatically provisioning resources on a computer network. A role-based access manager discovers one or more network resources. A provisioning manager then provisions the discovered network resources.

20 Claims, 5 Drawing Sheets

```xml
<device-model name="Microsoft Active Directory Discovery">
    <description>Discovers Microsoft Active Directory objects, such as computers, computer attributes, organizational units, users, and groups.</description>
    <device-model-category>Hardware Discovery</device-model-category>
    <workflow name="MSAD_Target_Discovery" />
    <workflow name="MSAD_User_Access_Discovery" />
    <workflow name="MSAD_Query_Discovery" />
    <workflow name="MSAD_Discovery_Profile_Update" />
    <dcm-property name="Requires Server" value="false" component="DEPLOYMENT_ENGINE" />
    <dcm-property name="Supports Discovery Policies" value="false" component="DEPLOYMENT_ENGINE" />
    <dcm-object-property-template name="Property template for MS Active Directory Server Discovery">
        <template-property name="Organization" is-array="false">
            <template-property-value value="true" is-default="true" />
            <template-property-role value="Domain admin" is-default="true" />>
            <template-property-role value="Domain Users" is-default="true" />
        </template-property>
        <template-property name="Group" is-array="false">
            <template-property-value value="true" is-default="true" />
            <template-property-role value="Domain admin" is-default="true" />
            <template-property-role value="Domain Users" is-default="true" />
        </template-property>
        <template-property name="User" is-array="false">
            <template-property-role value="Domain admin" is-default="true" />
            <template-property-role value="Enterprise Admins" is-default="true" />
            <template-property-role value="Schema Admins" is-default="true" />
            <template-property-role value="Domain Users" is-default="true" />
        </template-property>
        <template-property name="Server Name" is-array="false">
            <template-property-value value="hosting.VirginiaLab.corp.com" is-default="true" />
            <template-property-role value="Domain Users" is-default="true" />
        </template-property>
        <template-property name="Dynamic IPs (DHCP)" is-array="false">
            <template-property-value value="true" is-default="true" />
            <template-property-role value="Domain Users" is-default="true" />
        </template-property>
        <template-property name="Discovery Base Distinguished Name" is-array="false">
            <template-property-value value="DC=hurricane,DC=com" is-default="true" />
        </template-property>
        <template-property name="User Name" is-array="false">
            <template-property-value value="tioadmin" is-default="true" />
        </template-property>
        <template-property name="User Password" is-array="false">
            <template-property-value value="think4me" is-default="true" />
        </template-property>
        <template-property name="Default Access Domain" is-array="false">
            <template-property-value value="sample:all-objects" is-default="true" />
        </template-property>
        <template-property name="Gateway IP" is-array="false" />
            <template-property name="Gateway Subnet Mask" is-array="false" />
            <template-property name="Advanced Search" is-array="false" />
            <template-property name="Filter LDAP specific attributes" is-array="false">
                <template-property-value value="true" is-default="true" />
        </template-property>
    </dcm-object-property-template>
</device-model>
```

PROVISIONING OF RESOURCES IN A COMPUTER NETWORK

BACKGROUND OF THE INVENTION

1. Field of the Invention

The present invention relates generally to data processing systems and in particular to user and resource authorization in a computer network. Still more particularly, the present invention relates to a method, apparatus, and computer program product for selectively and programmatically provisioning of resources in a computer network.

2. Description of the Related Art

Modern computer networks are large, complex, and contain a mix of hardware, software, operating systems, configurations, and vendors. It is useful to be able to control user access to network resources, such as the various hardware and software components of the network.

Typically, access to network resources is managed using role-based authorization mappings, in which a user's role in an organization determines which network resources the user may access. Network resources may be hardware, such as computers and printers, connected to the computer network. Network resources may also be software, such as application programs, installed on computers or servers connected to the network.

Role-based authorization mappings are used to authorize the user to access specific network resources, based on each user's role. In a role-based authorization mapping, different roles are defined, and each role is mapped to a set of network resources which that role is authorized to access. The process of authorizing a user to access network resources is called provisioning.

Computer networks are dynamic in nature. After a computer network is initially provisioned, new network resources may be added, and existing network resources may be removed. The dynamic nature of computer networks requires that the network administrator keep track of changes to the available network resources and make appropriate changes to the provisioning. For example, when a new resource is added to a network, the network administrator provisions the new resource so that specific users can access the resource. However, changes to the resources in a network typically require that the network administrator manually provision each new resource, which is tedious and time-consuming.

SUMMARY OF THE INVENTION

The different embodiments provide a method, apparatus, and computer program product for selectively and programmatically provisioning resources on a computer network. A role-based access manager discovers one or more network resources. A provisioning manager then provisions the discovered network resources.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 8 is an example of a workflow written in extended markup language (XML).

DETAILED DESCRIPTION OF THE PREFERRED EMBODIMENT

Figure 1:
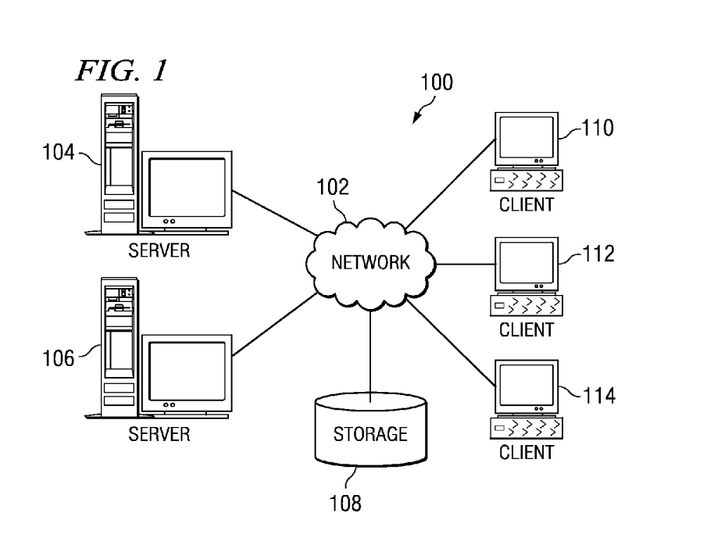
FIG. 1 depicts a pictorial representation of a network of data processing systems in accordance with an illustrative embodiment.
Figure 2:
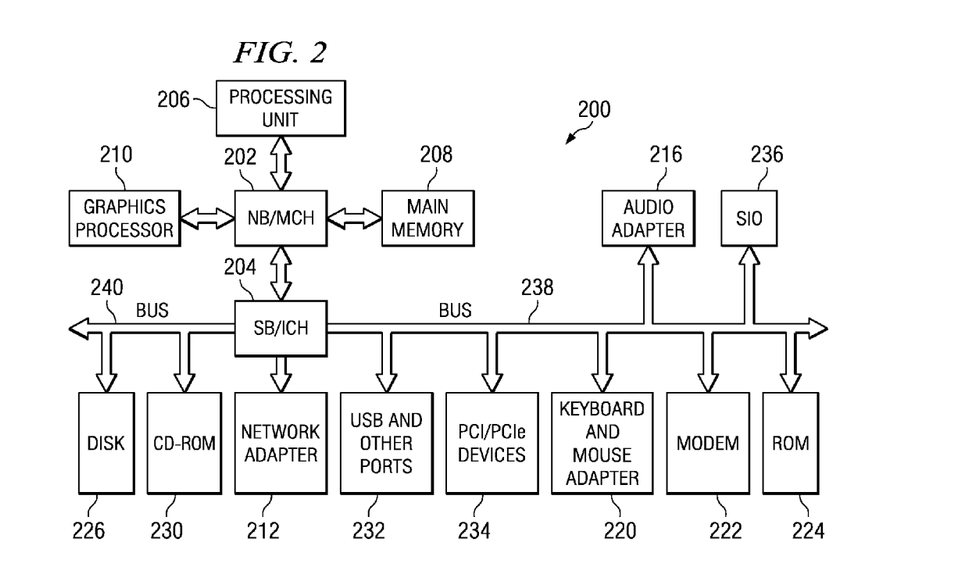
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200. Java and all Java-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The different embodiments provide a method, apparatus, and computer program product for selectively and programmatically provisioning resources on a computer network. A role-based access manager discovers one or more network resources. A provisioning manager then provisions the discovered network resources.

Provisioning is the process of authorizing a user access to network resources. A discovery profile is a file containing commands that are executed when the discovery profile is run. A file containing commands that are executed, when the file is run, is called a script. Typically, a provisioning manager provides a language, such as extended markup language (XML), for writing scripts such as a discovery profile.

Here, the discovery profile executes commands to discover specific network resources. Discovery is the process of finding new network resources, or finding changes to existing network resources. The commands in the script specify the type of resources the discovery profile finds. For example, a discovery profile may specify that the discovery profile find all printers on a network.

When a user logs on to a computer, such as client 110 in FIG. 1, the computer authenticates the user by determining whether the user is allowed to log on. Typically, the user is authenticated by sending a request to a server, such as server 104 in FIG. 1, which is running an authentication scheme such as lightweight directory access protocol (LDAP). If the user is authenticated, the computer authorizes the user to access certain network resources, typically by assigning the user a role which allows the user access to those network resources.

Network resources may be hardware, such as computers and printers, connected to the computer network. Network resources may also be software, such as application programs, which are installed on computers or servers connected to the network. Provisioning a user authorizes the user to access specific hardware and software resources on the network.

The most common method of assigning users one or more roles for network access is to use a role-based access mapping. Typically, a role-based access manager is used to assign users one or more roles. In role-based access mapping, various roles, such as, for example, data entry, customer service, supervisor, and manager are defined, and each role is mapped to a set of network resources which an employee can access in that role. Thus, a user in a supervisor role may have access to additional network resources compared to a user in an employee role. Similarly, a user who belongs to a particular group in an organization may not be able to access the network resources that belong to another group in the organization.

For example, a testing organization in a company might test the company's products during the product's design phase. The testing organization might have a special network containing network resources used to test the products. Using role-based mapping, only those employees assigned a role as a member of the testing organization would be allowed to access the network resources of the testing organization.

Modern computer networks are dynamic because network resources are constantly being added or removed. When network resources change, network administrators discover what changes have been made to the resources in the network and then manually make appropriate changes to the role-based mappings. However, manually discovering changes to network resources and manually making changes to role-based mappings is time-consuming. Therefore, the embodiments recognize that it would be useful if there was a way to programmatically discover and provision the discovered network resources.

As previously mentioned, discovery is the process of finding new network resources, or finding changes in the configuration of existing network resources. A network resource may be a hardware resource such as a computer, switch, subnet, or a software resource such as a software application. A network device discovery is usually performed periodically and stored in a central repository so that information about the network's current hardware and software configuration is kept up-to-date.

There are three different types of discovery that may be performed, (i) general resource discovery, (ii) user resource discovery, and (iii) discovery using resource authorization mappings. In general resource discovery, all the resources under one organization are discovered. In user resource discovery, all the resources a user may access are discovered. First, all the roles a user may have are discovered, and then all the resources those roles may access are discovered to create a list of all resources the user is authorized to access. In discovery with resource authorization mappings, the mappings of roles to resources are used to discover resources.

There are several products available for role-based access management, such as International Business Machines (IBM®) Tivoli Directory Server (ITDS), Microsoft® Active Directory (MSAD), and Novell® Directory. The examples given below use Microsoft® Active Directory. However, those versed in the art will appreciate that the present invention may be implemented using any similar role-based access manager. Similarly, the examples given below use Tivoli Provisioning Manager® (TPM), but those versed in the art will appreciate that any similar provisioning management tool may be used.

A role-based access manager performs various functions, including managing identities, managing roles, managing organizations, setting identity authorization conditions, supporting centralized system management, and auditing, logging and reporting. By using discovery in conjunction with a role-based access manager, network resources can be selectively and programmatically discovered and provisioned by mapping the discovered resources to authorization roles.

A provisioning manager typically provides a way of creating a script so that a series of operations may be performed in sequence. For example, workflow in Tivoli Provisioning Manager allows users to create scripts containing commands to carry out various operations.

Typically, when a provisioning manager is used to discover resources, the result is the discovery of a large number of resources, such as, for example, hundreds of computers. However, discovering a large number of resources is not particularly meaningful because there is no information about the resources. The embodiments recognize that it would be useful if the discovered resources were organized in a more meaningful way.

Many companies are organized in a hierarchical tree, with each supervisor or manager above the employees the supervisor directly oversees. Often, a role-based access manager will use the company's hierarchical organization tree to manage user authorization.

One way to make discovered resources more meaningful is to organize the discovered resources in a hierarchical tree, similar to the company's hierarchical organization tree. The discovered resources may be organized in a hierarchical tree by creating a discovery profile that sends discovery queries to the role-based access manager using the company's hierarchical organization tree. The discovered resources can then be organized in a hierarchical structure.

Figure 3:
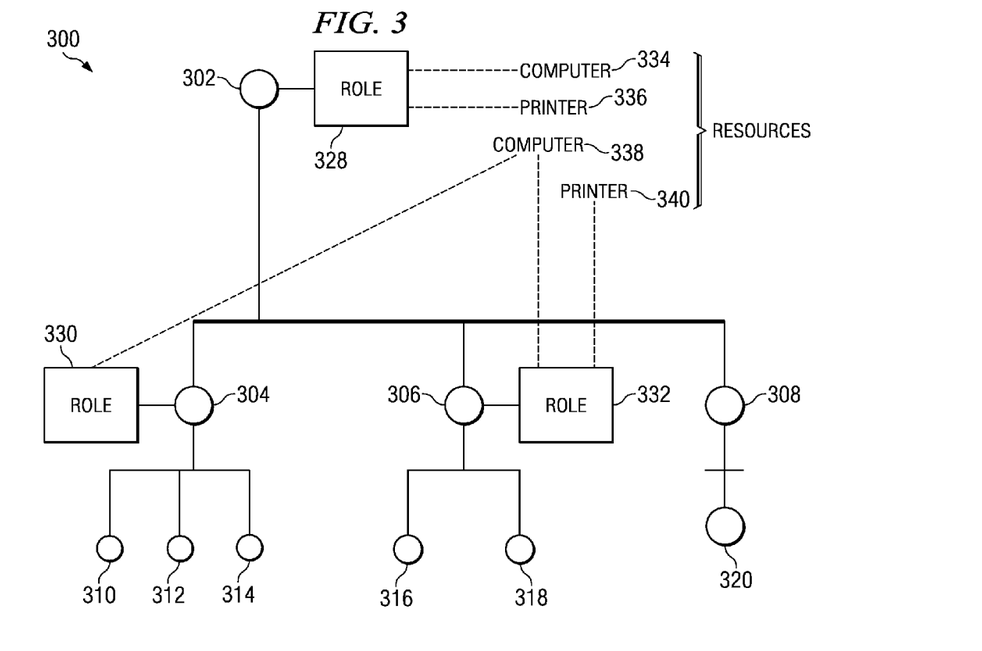
FIG. 3 is a diagram of a hierarchical tree in which different embodiments may be implemented.

With reference now to FIG. 3, a diagram of a hierarchical tree is illustrated in which different embodiments may be implemented. In hierarchical tree 300, objects 302 through 320 are organized in a hierarchical tree. An object may, for example, be a group, an organization, a user, or a network resource, such as a computer, or printer.

By sending a discovery query for each object in the organization tree, determining the role associated with that object, and then discovering the resources each role has access to, the discovered resources can be organized in a hierarchical structure.

For example, in FIG. 3, object 302 has an associated role 328. Each role has associated with it one or more accessible resources. Here, role 328 has access to the resources computer 334 and printer 336. Object 304 has associated with it role 330, and role 330 has access to the resource computer 338. Object 306 has associated with it role 332, and role 332 has access to the resources computer 338 and printer 340.

The resources accessible to each object in the organization tree are discovered by sending a discovery query to the role-based access manager. Each discovery query uniquely identifies each object. Each object in an organization tree may be uniquely identified by specifying the scope and type. The scope is a specific branch of the organization, and is typically specified by a department name and a path to the department. The type indicates the type of object, such as whether it is a group, an organization, a user, or a computer. Specifying a particular scope and type uniquely identifies each object in an organization tree, and is called the distinguished name (DN).

For example, suppose that objects 302, 304, 306, and 308 are salespeople, with salesperson 302 in department "Sales", salesperson 304 in department "Western Sales", salesperson 306 in department "Central Sales", and salesperson 308 in department "Eastern Sales". Here, for node 304, the scope is the department name "Western Sales" and the path "Sales/Western Sales", while the type for node 304 is salesperson.

A second way to make discovery more meaningful is to perform discovery on a per-user basis. In per-user discovery, a specific user is chosen or specified and all roles for that user are first discovered. Next, all the resources that can be accessed by each role are discovered. In this way, all the resources accessible to a given user in the user's various roles are discovered.

After discovery is completed, the provisioning manager stores in a central repository (i) the user's identity and (ii) the discovered resources associated with that user. The provisioning manager can then provision the discovered resources.

Figure 4:
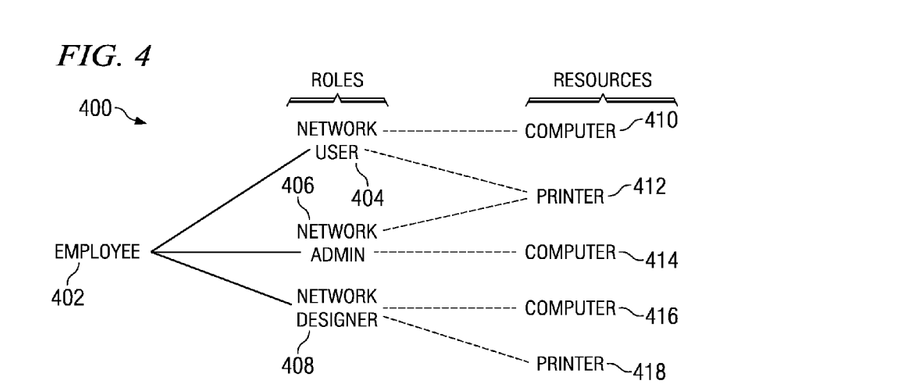
FIG. 4 is a diagram of a per-user discovery in which different embodiments may be implemented.

With reference now to FIG. 4, a diagram of a per-user discovery 400 is illustrated in which different embodiments may be implemented. Here, employee 402 has three associated roles, network user 404, network admin 406, and network designer 408. The role of network user 404, has associated with it computer 410 and printer 412.

The role of network admin 406 has associated with it computer 414 and printer 412. Computer 414 may have a larger monitor to facilitate viewing and administering the network. The role of network designer 408 has associated with it computer 416 and printer 418. Computer 416 may be a workstation that runs network design software and printer 418 may be a printer that can plot large network diagrams.

A third way to make discovery more meaningful is to combine the previous two methods. In this third method, the discovery profile contains, among other things, role mappings and resource mappings. In Tivoli Provisioning Manager a workflow is a script containing commands that are executed when the script is run. Thus, in Tivoli Provisioning Manager, a discovery profile may be implemented using a workflow.

The discovery profile specifies the type of objects which the network administrator wants to discover. An object may be, for example, an organization, a group, a user, a computer, or a printer. The discovery profile contains a resource mapping in which there are objects and, associated with each object, a set of roles that can access the object. The resource mapping may be stored in the form a tree or a table. Some examples of roles include supervisor, tester, domain admin, enterprise admin, schema admin, and domain user. The discovery profile also contains a role mapping, which maps users to roles.

In the third method, running the discovery profile discovers objects based on the roles that can access that object. In the examples given here, the object is a network resource.

Figure 5:
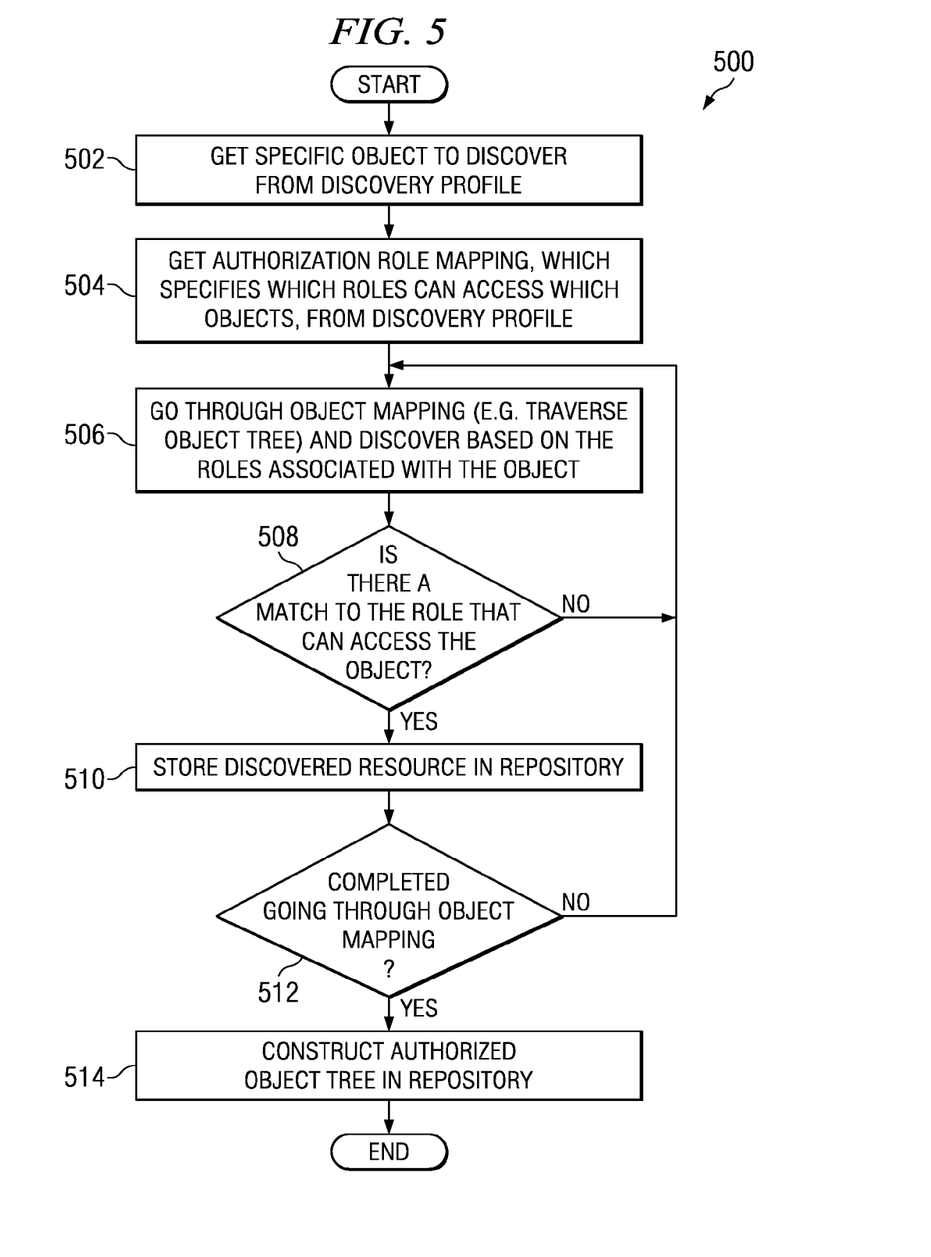
FIG. 5 is a flowchart of a discovery using resource authorization mappings.

With reference now to FIG. 5, a diagram of a discovery profile is illustrated in which different embodiments may be implemented. The discovery profile 500 performs discovery using resource authorization mappings, and is typically executed by a provisioning manager.

A specific object to be discovered is retrieved from the discovery profile (step 502). An object may be a computer resource, such as a computer. The authorization role mapping, which specifies which roles can access which objects, is retrieved from the discovery profile (step 504). Typically, the authorization role mapping is stored in the form of a tree structure.

The authorization role mapping is scanned for a role which is authorized to access the specified object (step 506). A determination is made as to whether a role has been found that is authorized to access the specified object (step 508). If the answer is "yes", then the object is stored (step 510). If the answer is "no", then the process is repeated, starting with step 506. Once the object is stored, a determination is made as to whether the authorization role mapping has been completely scanned (step 512). If the answer is "yes", then an authorized object tree is constructed (step 514), and the process ends. If the answer is "no", then the process repeats starting with step 506.

Figure 6:
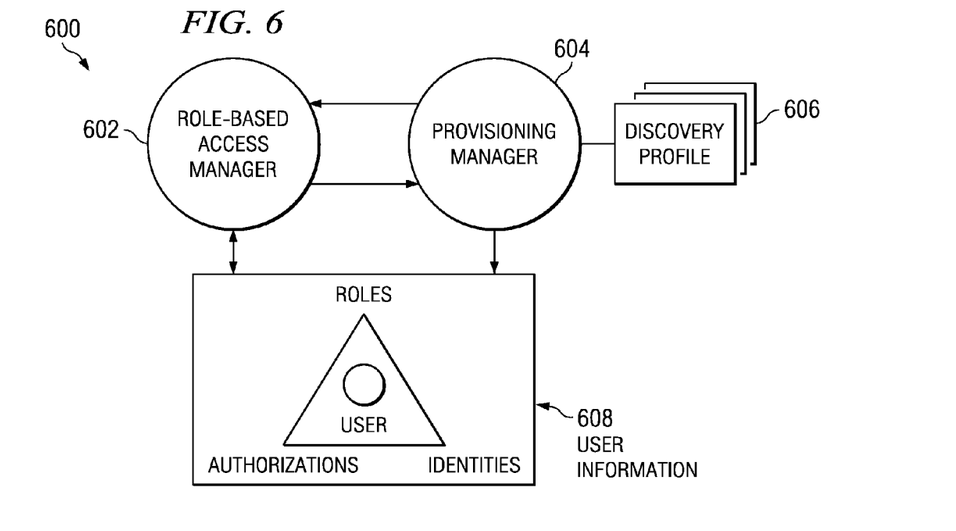
FIG. 6 is a diagram of the software processes in which different embodiments may be implemented.

With reference now to FIG. 6, a block diagram of software processes is illustrated. In software processes 600, role-based access manager 602, and provisioning manager 604 are software processes which may be running on a single computer or distributed across multiple computers in a network.

As previously mentioned, there are three different types of discovery that may be performed, general resource discovery, user resource discovery, and discovery with resource authorization mappings. Provisioning manager 604 executes discovery profile 606. Discovery profile 606 is a script containing commands and specifies information to be gathered. Executing discovery profile 606 sends discovery queries to role-based access manager 602. Each discovery query is a request for information, such as, for example, the roles associated with a user, or the resources a given role is authorized to access.

When role-based access manager 602 receives a discovery request from provisioning manager 604, role-based access manager 602 accesses user information 608. User information 608 contains information about users, such as the roles each user has, the resources each role is authorized to access, and the identities of the users.

Role-based access manager 602 finds in user information 608 the information needed to answer the discovery query, and sends a response back to provisioning manager 604. Once provisioning manager 604 has completed discovering the information specified in discovery profile 606, provisioning manager 604 stores the information in user information 608. Discovery profile 606 may be written in extended Markup Language (XML) or other, similar language.

Figure 7:
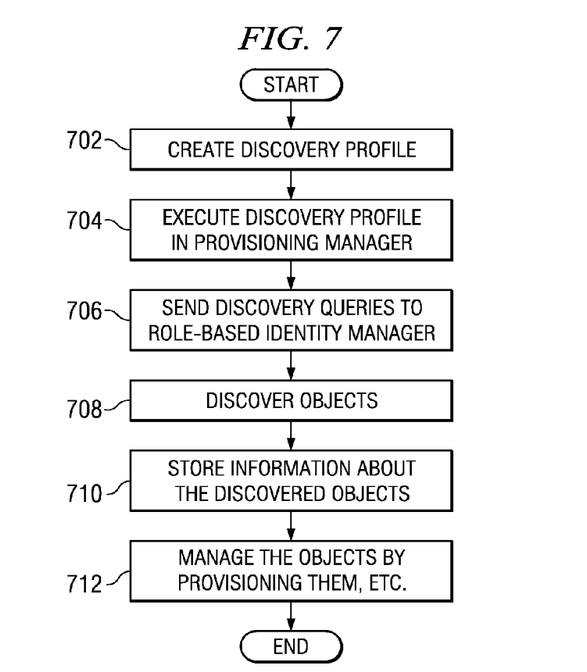
FIG. 7 is a flowchart of a process for automated provisioning of discovered network resources using role-based authorization mappings.

With reference now to FIG. 7, a flowchart of a process for selective and programmatic provisioning of discovered network resources is illustrated. The flowchart in FIG. 7 illustrates how provisioning of discovered network resources proceeds when using any one of the three different types of discovery described above. A discovery profile is created using a workflow for a provisioning manager (step 702). The discovery profile is executed in a provisioning manager (step 704). The discovery profile script contains commands that send discovery queries to a role-based access manager (step 706). Each discovery query finds resources that meet the specific criteria given in the query (step 708). Any one of the three previously described methods of discovery may be used in step 708.

The provisioning manager stores information about the discovered resources (step 710). The provisioning manager provisions the discovered resources (step 712), and then the process ends. For example, the provisioning manager may map the discovered resources to specific roles.

With reference now to FIG. 8, an example of a workflow written in extended markup language (XML) is given. FIG. 8 is an example of a discovery profile, such as discovery profile 606 in FIG. 6, for performing discovery using Microsoft Active Directory (MSAD).

The different embodiments provide a method, apparatus, and computer program product for selectively and programmatically provisioning resources on a computer network. A role-based access manager discovers one or more network resources. A provisioning manager then provisions the discovered network resources.

The embodiments thus described typically provide several advantages over conventional methods of provisioning network resources. First, resources are selectively and programmatically discovered and provisioned, freeing up system administrators from having to manually provision new resources. Second, resources are discovered in a way that allows them to be meaningfully grouped together, for example, in a hierarchical tree. Third, discovery can be conducted selectively for example per organization, per user, or based on resource authorization mappings.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for selectively and programmatically provisioning one or more network resources, the computer implemented method comprising:
   selecting a discovery by one of an organization in a hierarchy tree and a per-user-basis, wherein the discovery is further one of a general resource discovery type, a user resource discovery type, and a discovery using resource mapping type;
   responsive to a selection of an organization in a hierarchy tree, executing a discovery profile, wherein the discovery profile contains executable commands and discovery queries;
   discovering the one or more network resources using a hierarchical organization tree and a role-based access manager to form discovered network resources, wherein each discovery query of the discovery queries uniquely identifies an object;
   provisioning the discovered network resources using a provisioning manager; and
   organizing the discovered network resources into a hierarchical structure of the organization, wherein the organization further including specific branches.

2. The computer implemented method of claim 1, wherein provisioning the discovered network resources comprises:
   mapping user access authorizations to the discovered network resources.

3. The computer implemented method of claim 1, wherein discovering one or more network resources comprises:
   executing the discovery profile comprised of one or more discovery queries, wherein executing the discovery profile sends the one or more discovery queries to the role-based access manager.

4. The computer implemented method of claim 3, wherein the one or more discovery queries specify the organization, and the one or more network resources which belong to the specified organization.

5. The computer implemented method of claim 3, wherein each of the one or more discovery queries specify a user, and discovering the one or more network resources comprises:
   discovering one or more roles of the user; and
   discovering the network resources accessible to the one or more roles of the user.

6. The computer implemented method of claim 5, wherein each of the one or more discovery queries specify an object and a mapping between the one or more roles and one or more objects.

7. The computer implemented method of claim 3, wherein each of the one or more discovery queries further comprise a scope and a type for a discoverable object, wherein the scope is a specific branch of the organization and the type indicates a type of object, wherein the combination of the scope and the type forms a distinguished name that uniquely identifies the discoverable object in the hierarchical organization tree.

8. A data processing system for selectively and programmatically provisioning one or more network resources, the data processing system comprising:
   a bus;
   a storage device connected to the bus, wherein the storage device contains computer executable instructions;
   a communications unit connected to the bus;
   a processing unit connected to the bus, wherein the processing unit executes the computer executable instructions to direct the data processing system to:
   select a discovery by one of an organization in a hierarchy tree and a per-user-basis, wherein the discovery is further one of a general resource discovery type, a user resource discovery type, and a discovery using resource mapping type;
   responsive to a selection of an organization in a hierarchy tree, execute a discovery profile, wherein the discovery profile contains executable commands and discovery queries;
   discover the one or more network resources using a hierarchical organization tree and a role-based access manager to form discovered network resources, wherein each discovery query of the discovery queries uniquely identifies an object;

provision the one or more discovered network resources, using a provisioning manager; and organize the discovered network resources into a hierarchical structure of the organization, wherein the organization further including specific branches.

9. The data processing system of claim 8, wherein the processor unit further executes the computer executable instructions to provision each of the one or more discovered network resources by mapping user access authorizations to each of the one or more discovered network resources respectively.

10. The data processing system of claim 8, wherein the processor unit further executes the computer executable instructions to discover the one or more network resources by the role based access manager executing the discovery profile comprised of one or more discovery queries, wherein executing the discovery profile sends each of the one or more discovery queries to the role-based access manager.

11. The data processing system of claim 10, wherein the one or more discovery queries specify the organization, and each of the one or more discovered network resources belong to the specified organization.

12. The data processing system of claim 10, wherein the one or more discovery queries specify a user and wherein the processor unit further executes the computer executable instructions to discover the one or more network resources comprises:

discovering one or more roles of the specified user; and discovering resources each of the one or more roles of the specified user is authorized to access.

13. The data processing system of claim 10, wherein each of the one or more discovery queries specify an object and a mapping between the one or more roles and the one or more objects.

14. The data processing system of claim 10, wherein each of the one or more discovery queries further comprise a scope and a type for a discoverable object, wherein the scope is a specific branch of an organization and the type indicates a type of object, wherein the combination of the scope and the type forms a distinguished name that uniquely identifies the discoverable object in the hierarchical organization tree.

15. A computer program product for selectively and programmatically provisioning one or more network resources, comprising computer readable memory elements having computer executable program code stored therein, the computer executable program code comprising:

computer executable program code for selecting a discovery by one of an organization in a hierarchy tree and a per-user-basis, wherein the discovery is further one of a general resource discovery type, a user resource discovery type, and a discovery using resource mapping type;

computer executable program code responsive to a selection of an organization in a hierarchy tree, for executing a discovery profile, wherein the discovery profile contains executable commands and discovery queries;

computer executable program code for discovering the one or more network resources using a hierarchical organization tree and a role-based access manager to form discovered network resources, wherein each discovery query of the discovery queries uniquely identifies an object;

computer executable program code for provisioning each of the one or more discovered network resources using a provisioning manager; and computer executable program code for organizing the discovered network resources into a hierarchical structure of the organization, wherein the organization further including specific branches.

16. The computer program product of claim 15, wherein the computer executable code for provisioning each of the one or more discovered network resources comprises:

computer executable program code for mapping user access authorizations to each of the one or more discovered network resources.

17. The computer program product of claim 15, wherein the computer executable program code for discovering one or more network resources comprises:

computer executable program code for executing the discovery profile comprised of one or more discovery queries, wherein executing the discovery profile sends the one or more discovery queries to the role-based access manager.

18. The computer program product of claim 17, wherein the one or more discovery queries specify the organization, and each of the one or more discovered network resources belong to the specified organization.

19. The computer program product of claim 17, wherein the one or more discovery queries specify a user and the computer executable program code for discovering the one or more network resources comprises:

computer executable program code for discovering the roles of the specified user; and computer executable program code for discovering the resources each of the roles of the user is authorized to access.

20. The computer program product of claim 17, wherein each of the one or more discovery queries specify an object and a mapping between the one or more roles and the one or more objects and further comprises a scope and a type for a discoverable object, wherein the scope is a specific branch of an organization and the type indicates a type of object, wherein the combination of the scope and the type forms a distinguished name that uniquely identifies the discoverable object in the hierarchical organization tree.

* * * * *